(12) United States Patent
Overby, Jr. et al.

(10) Patent No.: US 6,785,729 B1
(45) Date of Patent: Aug. 31, 2004

(54) SYSTEM AND METHOD FOR AUTHORIZING A NETWORK USER AS ENTITLED TO ACCESS A COMPUTING NODE WHEREIN AUTHENTICATED CERTIFICATE RECEIVED FROM THE USER IS MAPPED INTO THE USER IDENTIFICATION AND THE USER IS PRESENTED WITH THE OPPRTUNITY TO LOGON TO THE COMPUTING NODE ONLY AFTER THE VERIFICATION IS SUCCESSFUL

(75) Inventors: Linwood Hugh Overby, Jr., Raleigh, NC (US); Patricia Jakubik, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 703 days.

(21) Appl. No.: 09/648,653

(22) Filed: Aug. 25, 2000

(51) Int. Cl.[7] .............................................. G06F 15/16
(52) U.S. Cl. ........................ 709/229; 709/225; 713/201
(58) Field of Search ................................ 709/229, 201, 709/203, 217–219, 223–224, 225, 227; 713/201

(56) References Cited

U.S. PATENT DOCUMENTS

| | | | | |
|---|---|---|---|---|
| 5,689,638 A | * | 11/1997 | Sadovsky | 709/229 |
| 5,999,711 A | * | 12/1999 | Misra et al. | 713/201 |
| 6,119,230 A | * | 9/2000 | Carter | 713/200 |
| 6,128,738 A | * | 10/2000 | Doyle et al. | 709/229 |
| 6,182,142 B1 | * | 1/2001 | Win et al. | 709/229 |
| 6,353,886 B1 | * | 3/2002 | Howard et al. | 713/156 |
| 6,401,211 B1 | * | 6/2002 | Brezak et al. | 713/201 |
| 6,484,258 B1 | * | 11/2002 | Haverty | 713/155 |
| 6,598,167 B2 | * | 7/2003 | Devine et al. | 713/201 |

OTHER PUBLICATIONS

IBM International Technical Support Organization, "Security in OS/390-based TCP/IP Networks", Nov., 1999.

* cited by examiner

Primary Examiner—Patrice Winder
Assistant Examiner—Philip B. Tran
(74) Attorney, Agent, or Firm—Jerry W. Herndon; Hoffman, Warnick & D'Alessandro, LLC

(57) ABSTRACT

An authenticated network user is verified as entitled to access a network node or server on the network node, before the user is presented with any opportunity to access the system. An initial exchange of conventional protocol messages occurs between the user and the node to establish initial communications. This is done without presenting to the user any opportunity to logon or to access an application. The network node requests the transmission of an authenticated user certificate from the user and the network node verifies from the user certificate that the user represented by the user certificate is entitled to access the node. If the user as identified by the certificate is not entitled to access, the initial connection is dropped and the user is denied any further access opportunity.

9 Claims, 3 Drawing Sheets

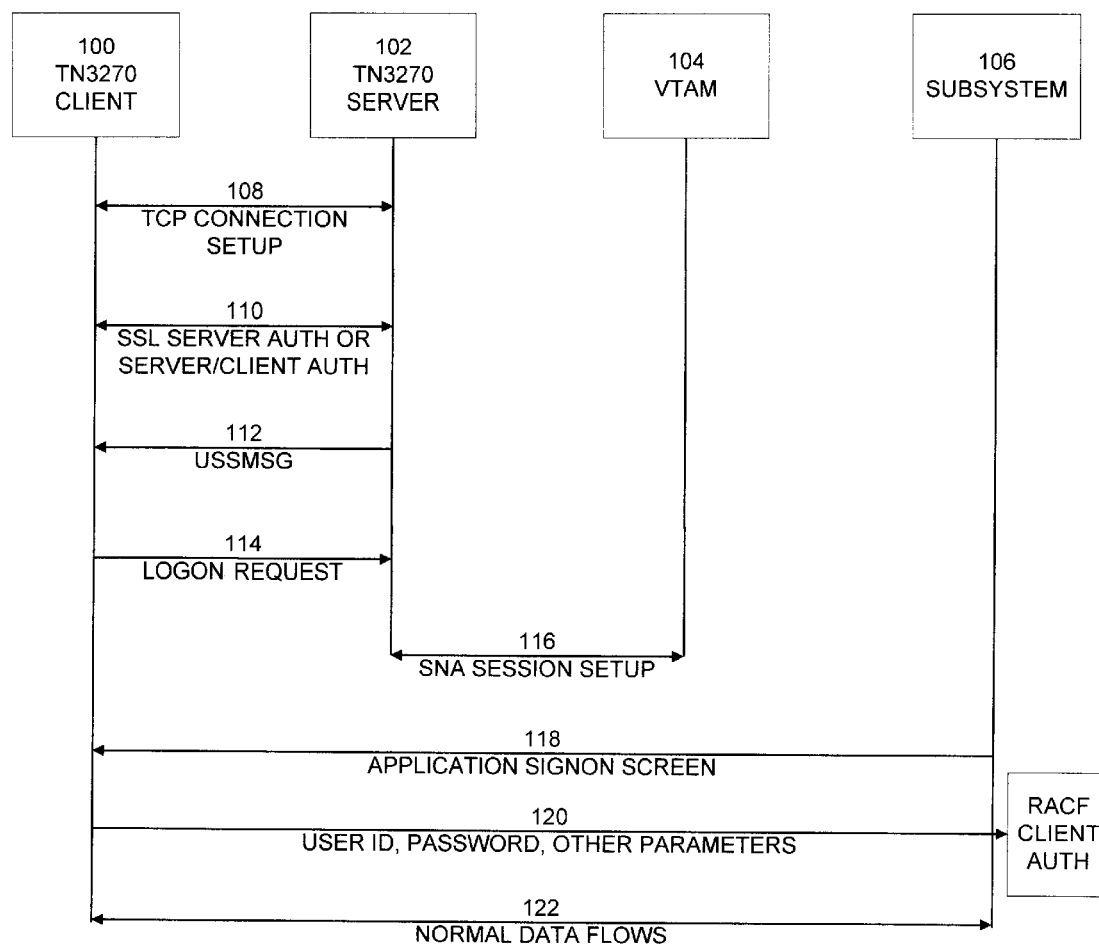

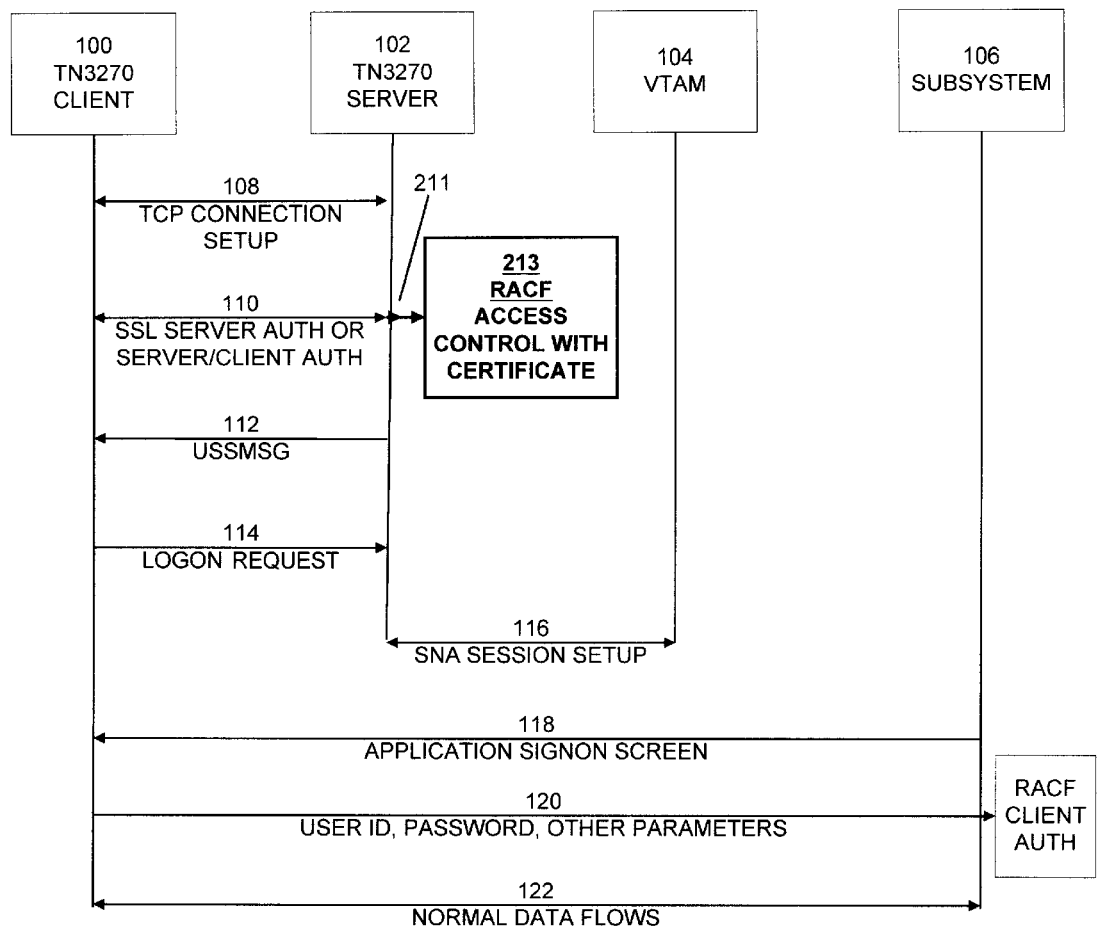

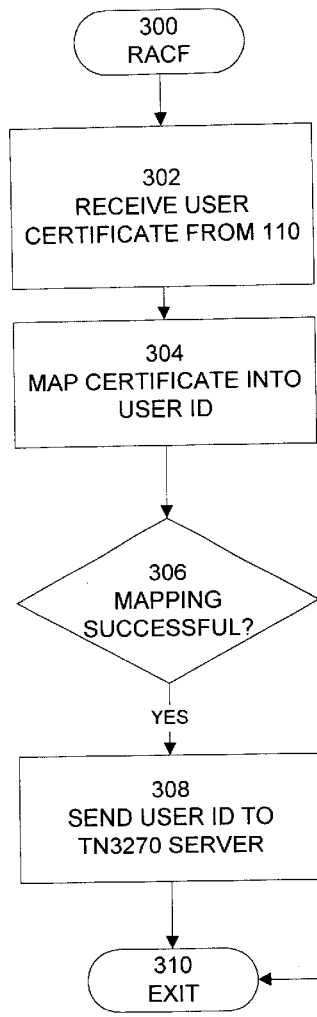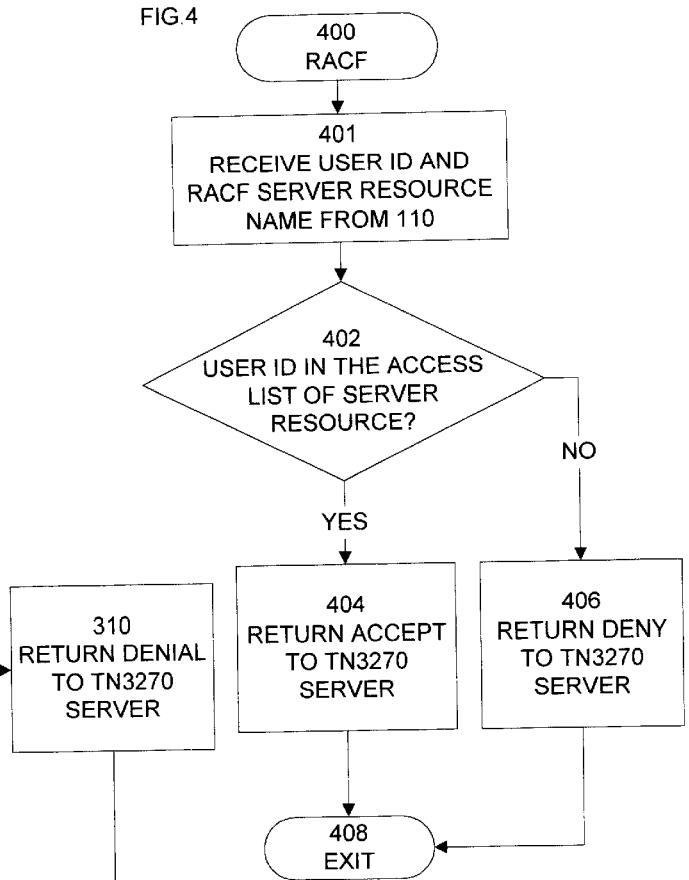

SYSTEM AND METHOD FOR AUTHORIZING A NETWORK USER AS ENTITLED TO ACCESS A COMPUTING NODE WHEREIN AUTHENTICATED CERTIFICATE RECEIVED FROM THE USER IS MAPPED INTO THE USER IDENTIFICATION AND THE USER IS PRESENTED WITH THE OPPRTUNITY TO LOGON TO THE COMPUTING NODE ONLY AFTER THE VERIFICATION IS SUCCESSFUL

TECHNICAL FIELD

The invention pertains to client authorization in a network and specifically to client authorization in such a way that access to a logon screen or menu is avoided until after the client has been authorized to logon.

BACKGROUND OF THE INVENTION

It is well known in network environments to verify that a user is entitled to service by a server or a remote application by presenting the user with a means to logon to the server or the remote application with a user identification and a password. While such means have been used for years with varying degrees of success, deficiencies still exist. For example, the presentation to a user of a logon screen or menu gives the user an opportunity to attempt to access the system, whether or not the user is actually entitled to service. It is also known to authenticate users with certificates provided by a trusted agency before providing to the user a logon screen. However, this certification authentication merely verifies that the user is who the user purports to be. It does not verify that the user is entitled to access. The provision of access alternatives, such as a logon screen or a menu or the like ,to a user after certificate authentication still gives the user an opportunity to attempt to access the system, even though the user may not be so entitled.

SUMMARY OF THE INVENTION

The invention verifies a network user as entitled to access a network node or server on the network node. It does this before the user is presented with any opportunity to access or logon to the system. When a user first attempts to access a network node, an initial exchange of conventional protocol messages occurs between the user and the node to establish initial communications. This is done without presenting to the user any opportunity to logon or to access an application. The network node requests the transmission of an authenticated user certificate from the user and the network node verifies that the user represented by the user certificate is entitled to access the node. If the user as identified by the certificate is not entitled to access, the initial connection is dropped and the user is denied any further access opportunity. If the user represented by the certificate is verified as being entitled to access, then and only then is the user presented with an access screen, such as a logon screen or an application menu.

BRIEF DESCRIPTION OF THE DRAWING

FIG. 1 shows prior art message flows between components of a network leading up to access to the system by a user;

FIG. 2 shows message flows in the same network as FIG. 1, in which the user is authorized as being entitled to access the network node or server on the network node before the user is presented with an opportunity to logon to the system;

FIG. 3 shows a flowchart of the steps executed at a security software module (213 of FIG. 2) for the purpose of generating a user identification from an authenticated user certificate; and FIG. 4 shows a flowchart of the steps executed at the security software module in response to receiving the user identification generated in FIG. 3 for verifying that the user is entitled to access the system.

DETAILED DESCRIPTION

FIG. 1 shows a network including, by way of example, a TN3270 client 100, a TN3270 server 102, IBM's Virtual Telecommunications Access Method software (VTAM) 104 and other subsystem components 106, such as RACF authorization software and client applications. Subsystem components other that the RACF client authorization module are not shown, as they are not necessary for an understanding of the invention. The TN3270 server 102, VTAM 104 and the subsystem components 106 can be part of the same computing node, although they don't have to be. As is well known, the TN3270 server 102 allows remote logon by TN3270 clients, such as 100, in an IP network. VTAM 104 can be considered as illustrative of software components that control telecommunications access to IBM's System Network Architecture (SNA) applications in a network. In IBM's SNA networks, VTAM can be considered to be part of the operating system of an IBM computer, such as the System/390.

In FIG. 1, the flow 108 TCP CONNECTION SETUP represents the conventional set of message flows that are transmitted between a TN3270 client and a TN3270 server when the client attempts to logon to the server. These are so well known within the art that no detail discussion is deemed necessary. Thereafter, if Secure Sockets Layer (SSL) communications is to be used on this session, a well known set of flows 110 are transmitted between the client and TN3270 server. This set of messages may authenticate the server to the client, or it may authenticate both the client and the server to each other. In the first case, the client is assured that the server to which it is communicating is in fact the server that the client thinks it is. In the latter case, in addition to the server authentication, the client is authenticated to the server. This assures to the server that the client is in fact who he or she says they are. At this point, conventional systems typically present a menu screen, such as at USSMSG 112, or a logon screen 118 or both, depending on the design of the system. If a menu screen is presented, as at 112, it typically consists of a listing of applications that the user might request; individual logon access to a selected application, often with password, etc., is left to the application as at 118. Some systems present a logon screen and require the user to present an identification and password before the menu of applications is presented. In either event, the user is presented with a logon screen, which gives the user an opportunity to attempt improperly to logon to the server. The most that the server knows at this point is that the user is certified to be who he or she says they are. There is no assurance that the user is entitled to access the server or any application accessible through the server. So, the presentation of a logon or menu screen at this point is weak link in the chain of security.

The remaining flows of FIG. 1 are illustrative and conventional and represent a Systems Network Architecture (SNA) session setup by VTAM at 116 in response to a successful (whether valid or invalid) logon request at 114, an application logon screen at 118, if the selected applications requires that, and a logon at 120, using as an example the security of IBM's RACF system. If the user is successful in getting past the logon 114 and the authentication at 120, then normal operations continue at 122.

FIG. 2 shows the message flows similar to FIG. 1, except that now a security authorization step has been inserted into the process in a manner to avoid the presentation to the user of any chance of logging on if the user is not certified to be entitled to logon. Components that correspond to similar components in FIG. 1 are given the same numerical designation as in FIG. 1 for clarity. To accomplish the security authorization step before any logon screen is presented, after the initial TCP setup flows 108 and during the initial SSL authentication at 110, a user certificate is passed from the user to the TN3270 server and hence at 211 to an initial authorization entity, which happens to be RACF 213 in this preferred embodiment. The certificate is sent to the TN3270 server 102 as part of the SSL handshake. The SSL handshake occurs prior to any data transfer and is used to negotiate cryptographic options, to generate session keys and to authenticate the user identity. The certificate is sent when the optional client authentication function of SSL is used. The optional client authentication function of SSL is requested by the TN3270 server 102 during the SSL handshake by sending to the user station a "certificate request" SSL message.

RACF is a well known IBM security mechanism for authenticating and authorizing users and systems. The details of operation of RACF can be found in many publicly available documents, including for example, the IBM Redbook "RACF Support for Open Systems" (GG26-2005). RACF 213, in response to a request from the TN 3270 server, verifies from the certificate that the user is entitled to receive a logon screen or an application menu. In other words, RACF 213 is used to verify that the user is at least entitled to access the system for-the purpose of attempting to perform further operations. If the user passes this new step of authorization, then he or she is presented with additional flows that are the same in principle to those of FIG. 1, namely the opportunity to proceed further. If the user fails the authorization step of 213, then further access is immediately denied and the user is given no opportunity to access the system.

FIG. 3 shows a flowchart of the operations that are performed by RACF 213 in the initial authorization of the user. At step 302, RACF 213 receives from the TN3270 server 102 a user certificate. At step 304, RACF maps the certificate into a user identification. Step 306 determines if the mapping was successful. If there is no user identification associated with the certificate, step 310 returns a deny service code to the TN3270 server. If the mapping was successful, step 308 returns the user identification to the TN3270 server 102.

The TN3270 server 102 receives the user identification generated by RACF 213 and makes a second call at 400 of FIG. 4. Step 401 obtains from input parameters of the RACF call the user identification and a RACF server resource name for the TN3270 server 102. It is possible, of course, to combine the steps of FIGS. 3 and 4 into one call to a security module. However, in the preferred embodiment, this would entail making changes to the RACF interface. The two step process of FIGS. 3 and 4 avoids this problem. Step 402 initially determines if the user identification is on an access list associated with the resource name. If the user identification is listed, RACF 213 returns at step 404 a code to allow the TN3270 102 to accept the user connection. As a result, the TN3270 server proceeds with the remaining operations of FIG. 2, such as presenting a menu of application at 212, to the user. However, if the user certificate is not listed by RACF 213, RACF 213 returns to the TN3270 server 102 at step 406 a code to deny further access to the user. As a result, the TN3270 server 102 immediately drops the user connection, without presenting the user with any further opportunity to access the system.

Skilled artisans in the fields to which the invention pertains will recognize that numerous variations can be made to the embodiments disclosed herein and still remain within the sprit and scope of the invention.

What is claimed:

1. A method of authorizing a network user as entitled to access a computing node of the network, comprising performing an initial exchange of protocol messages between the network user and the computing node to establish initial communications without presenting to the user any screen that might be used to access the computing node, presenting an authenticated user certificate from the user to the computing node, mapping the authenticated user certificate into a user identification associated with the user, verifying from the user certificate that the user represented by the user certificate is entitled to access the computing node based on the user identification and a resource name assigned to the computing node, denying further access to the computing node if the user is not entitled to access the computing node, and presenting the user with an opportunity to logon to the computing node if the user is verified to access the computing node.

2. A method of authorizing a network user as entitled to access the network, comprising receiving at a node of the network one or more initial protocol messages from a user station to establish initial communications with the user station without presenting to the user station a logon screen, receiving an authenticated user certificate from the user station, mapping the authenticated user certificate into a user identification associated with the user, verifying from the user certificate that the user represented by the user certificate is entitled to access a computing node based on the user identification and a resource name assigned to the node, denying further access to the computing node if the user is not entitled to access the computing node, and displaying an access screen to the user if the user is verified to access the computing node.

3. Apparatus for authorizing a network user as entitled to access a computing node of the network, comprising means for performing an initial exchange of protocol messages between the user and the computing node to establish initial communications without presenting to the user an access screen, means for presenting an authenticated user certificate from the user to the computing node, means for mapping the authenticated user certificate into a user identification associated with the user, means for verifying from the user certificate that the user represented by the user certificate is entitled to access the computing node based on the user identification and a resource name assigned to the computing node, means for denying further access to the computing node if the user is not entitled to access the computing node, and means for presenting the user with an opportunity to logon to the computing node if the network user is verified to access the computing node.

4. Apparatus for authorizing a network user as entitled to access a network, comprising means for receiving at a node of the network one or more initial protocol messages from a user station to establish initial communications with the user without presenting to the user an access screen, means for receiving an authenticated user certificate from the user station, means for mapping the authenticated user certificate into a user identification associated with the user, means for verifying from the user certificate that the user represented by the user certificate is entitled to access the computing node based on the user identification and a resource name assigned to the node, means for denying further access to the computing node if the user is not entitled to access the computing node, and means for transmitting an access screen to the user node if the user is verified to access the computing node.

5. A program product embodied in a storage media and containing program instructions readable by a computer for authorizing a network user as entitled to access a computing node of the network, comprising a first program segment for performing an initial exchange of protocol messages between the user and the computing node to establish initial communications without presenting to the user an access screen, a second program segment for presenting an authenticated user certificate from the user to the computing node, a third program segment for mapping the authenticated user certificate into a user identification associated with the user, a fourth program segment for verifying from the user certificate that the user represented by the user certificate is entitled to access the computing node based on the user identification and a resource name assigned to the computing node, a fifth program segment for denying further access to the computing node if the user is not entitled to access the computing node, and a sixth program segment for presenting the user with an opportunity to logon to the computing node if the user is verified to access the computing node.

6. A program product embodied in a storage media and containing program instructions readable by a computer for authorizing a network user as entitled to access the network, comprising a first program segment for receiving at a node of the network one or more initial protocol messages from a user to establish initial communications with the user station without presenting to the user station an access screen, a second program segment for receiving an authenticated user certificate from the user station, a third program segment for mapping the authenticated user certificate into a user identification associated with the user, a fourth program segment for verifying from the user certificate that the user represented by the user certificate is entitled to access the computing node based on the user identification and a resource name assigned to the node, a fifth program segment for denying further access to the computing node if the user is not entitled to access the computing node, and a sixth program segment for transmitting an access screen to the user if the user is verified to access the computing node.

7. A carrier wave embodying program instructions readable by a computer for authorizing a network user as entitled to access a computing node of the network, the computer instructions comprising a first program segment for performing an initial exchange of protocol messages between the user and the computing node to establish initial communications without presenting to the user an access screen, a second program segment for presenting an authenticated user certificate from the user to the computing node, a third program segment for mapping the authenticated user certificate into a user identification, a fourth program segment for verifying from the user certificate that the user represented by the user certificate is entitled to access the computing node based on the user identification and a resource name assigned to the computing node, a fifth program segment for denying further access to the computing node if the user is not entitled to access the computing node, and a sixth program segment for presenting the user with an opportunity to access the computing node if the user is verified to access the computing node.

8. A carrier wave embodying program instructions readable by a computer for authorizing a network user as entitled to access the network, the computer instructions comprising a first program segment for receiving at a node of the network one or more initial protocol messages from a user to establish initial communications with the user without presenting to the user an access screen, a second program segment for receiving an authenticated user certificate from the user, a third program segment for mapping the authenticated user certificate into a user identification associated with the user, a fourth program segment for verifying from the user certificate that the user represented by the user certificate is entitled to access the computing node based on the user identification and a resource name assigned to the node, a fifth program segment for denying further access to the computing node if the user is not entitled to access the computing node, and a sixth program segment for transmitting an access screen to the computing node if the user is verified to access the computing node.

9. The apparatus of claim 1, wherein the computing node is a server and wherein the authenticated certificate is passed from the server to a Resource Access Control Facility (RACF) where the mapping is performed, wherein the RACF accesses an access list that contains user identifications associated with resource names to verify that the user is entitled to access the computing node, and wherein the user is entitled to access the computing node if the user identification is associated with the resource name on the access list.

* * * * *